US008672331B2

(12) United States Patent
Braun et al.

(10) Patent No.: US 8,672,331 B2
(45) Date of Patent: Mar. 18, 2014

(54) TOOL HOLDER FOR A POWER TOOL, PARTICULARLY FOR A CHISEL HAMMER AND/OR ROTARY HAMMER

(75) Inventors: Willy Braun, Neustetten (DE); Christian Koepf, Denkendorf (DE)

(73) Assignee: Robert Bosch GmbH, Stuttgart, DE (US)

( * ) Notice: Subject to any disclaimer, the term of this patent is extended or adjusted under 35 U.S.C. 154(b) by 505 days.

(21) Appl. No.: 12/665,616

(22) PCT Filed: Apr. 22, 2008

(86) PCT No.: PCT/EP2008/054830
§ 371 (c)(1), (2), (4) Date: Dec. 18, 2009

(87) PCT Pub. No.: WO2008/155152
PCT Pub. Date: Dec. 24, 2008

(65) Prior Publication Data

US 2010/0176561 A1 Jul. 15, 2010

(30) Foreign Application Priority Data

Jun. 21, 2007 (DE) ........................ 10 2007 028 486

(51) Int. Cl.
*B23B 31/22* (2006.01)
*B25D 17/08* (2006.01)

(52) U.S. Cl.
USPC ............................ 279/19.4; 279/19.6; 279/22

(58) Field of Classification Search
USPC ................ 279/19.4, 19.6, 22, 75, 19, 82, 905
See application file for complete search history.

(56) References Cited

U.S. PATENT DOCUMENTS 4,107,949 A * 8/1978 Wanner et al. ................ 464/167
4,434,859 A * 3/1984 Rumpp et al. .................. 173/48
4,491,444 A * 1/1985 Rumpp et al. ................ 409/234
4,824,298 A * 4/1989 Lippacher et al. ............ 408/240
5,601,388 A * 2/1997 Lauterwald ............... 408/239 R
5,971,403 A * 10/1999 Yahagi et al. ................ 279/19.3
6,241,026 B1 * 6/2001 Wache et al. ................. 173/132
6,651,990 B2 * 11/2003 Higasi et al. ................. 279/19.4
6,669,206 B2 * 12/2003 Hanke .......................... 279/19.4
6,745,850 B2 * 6/2004 Hahn ........................... 173/132
6,854,740 B2 * 2/2005 Baumann et al. ............ 279/19.6
7,032,683 B2 * 4/2006 Hetcher et al. .................... 173/1

(Continued)

FOREIGN PATENT DOCUMENTS

DE 102005015100 A1 10/2006
EP 1293303 A1 3/2003

(Continued)

*Primary Examiner* — Eric A Gates
*Assistant Examiner* — Bayan Salone
(74) *Attorney, Agent, or Firm* — Maginot, Moore & Beck

(57) ABSTRACT

The invention relates to a tool holder for an electric tool, particularly for a chisel hammer and/or drill hammer. A tool receptacle is provided for receiving a cylindrical shaft of an insertion tool introduced through an insertion opening. The cylindrical shaft has at least two diametrically opposed detent depressions on its circumferential surface. The tool holder further has a locking device having at least one locking element, at least one blocking element and at least one restoring element. According to the invention, the locking device has at least two locking elements. Upon insertion of the cylindrical shaft of the insertion tool, the restoring element applies different forces to the locking elements of the locking device.

15 Claims, 2 Drawing Sheets

(56) References Cited

U.S. PATENT DOCUMENTS

| | | | | |
|---|---|---|---|---|
| 7,168,504 | B2 * | 1/2007 | Hetcher et al. | 173/104 |
| 7,258,349 | B2 * | 8/2007 | Frauhammer et al. | 279/19 |
| 7,284,622 | B2 * | 10/2007 | Hahn | 173/132 |
| 7,712,746 | B2 * | 5/2010 | Manschitz et al. | 279/37 |
| 7,997,837 | B2 * | 8/2011 | Furusawa et al. | 408/239 R |
| 8,066,290 | B2 * | 11/2011 | Kleine et al. | 279/19.3 |
| 8,172,235 | B2 * | 5/2012 | Furusawa et al. | 279/19.4 |
| 2002/0125652 | A1 * | 9/2002 | Hanke | 279/19.4 |
| 2003/0025281 | A1 * | 2/2003 | Higasi et al. | 279/19.4 |
| 2003/0047888 | A1 | 3/2003 | Hahn | |
| 2004/0245731 | A1 * | 12/2004 | Frauhammer et al. | 279/19 |
| 2005/0016745 | A1 * | 1/2005 | Hahn | 173/132 |
| 2006/0192350 | A1 * | 8/2006 | Kleine et al. | 279/19.3 |
| 2007/0024013 | A1 * | 2/2007 | Hauptmann et al. | 279/75 |
| 2008/0197583 | A1 * | 8/2008 | Furusawa et al. | 279/30 |

FOREIGN PATENT DOCUMENTS

| | | | |
|---|---|---|---|
| EP | 1695797 | A2 | 8/2006 |
| EP | 1958734 | A | 8/2008 |
| GB | 2410212 | A | 7/2005 |
| JP | 2007036907 | * | 2/2007 |
| WO | 03022531 | A1 | 3/2003 |

* cited by examiner

TOOL HOLDER FOR A POWER TOOL, PARTICULARLY FOR A CHISEL HAMMER AND/OR ROTARY HAMMER

CROSS-REFERENCE TO RELATED APPLICATION

This application is a 35 USC 371 application of PCT/EP2008/054830 filed on 22 Apr. 2008.

BACKGROUND OF THE INVENTION

1. Field of the Invention

The invention relates to a tool holder, in particular for a chisel hammer and/or rotary hammer.

2. Description of the Prior Art

For receiving and axially locking drilling or chiseling tools in percussively operated power tools, various tool holders are known. Tool holders of the kind described among other places in German Patent Disclosure DE 10 2005 015100 A1 have a tool receptacle for receiving a cylindrical shaft, introduced through an insertion opening, of a tool insert. In the cylindrical circumferential surface of the shaft, two diametrically opposed detent indentations are provided. The tool holder also has a locking device, which includes a locking element, a blocking element, and a restoring element.

Locking of the tool insert in the tool receptacle is done automatically upon insertion. Here the locking element is displaced axially, counter to the restoring element acted upon by restoring force—usually implemented by a prestressed restoring spring—in the direction of the housing of the power tool until such time as it can deflect radially behind the blocking element into a deflection chamber defined by the restoring element. As the tool insert is pushed in farther, the locking element can then plunge radially into one of the detent indentations provided for it in the shaft of the tool insert and is thrust again in the axial direction to beneath the blocking element by the axially prestressed restoring element.

By axial displacement of the blocking element away from the position of repose defined by the restoring force and a contact face, the locking element can emerge radially from the detent indentation, so that the tool insert can be removed from the tool receptacle by pulling on the tool insert.

In all operating states, the tool locking means must ensure a secure hold of the tool insert in the tool receptacle.

Particularly at the transition from the hammering state to the idling state of the power tool, strong forces on the tool axis defined by the tool insert and oriented in the direction away from the power tool occur, which speed up the tool insert. This thus-caused sudden motion of the tool insert must be absorbed by the locking element and the motion must be stopped. In the process, the locking element is subjected to both axially and radially heavy loads.

Because of the constantly increasing hammering power of power tools, the thus-increasing loads on the locking element cause accelerated wear to components of the locking device—particularly of the locking element. Because of the sudden type of load, the vibratable locking device is additionally caused to vibrate, and the vibration adversely affects the load distribution.

ADVANTAGES AND SUMMARY OF THE INVENTION

A tool holder of the invention has a tool receptacle as well as a locking device with two locking elements, one blocking element and one restoring element. The two locking elements, in a structurally simple and economical way, enhance the safety of use and lengthen the service life of the locking device. The restoring element of the invention upon insertion of the shaft of the tool insert into the tool receptacle exerts different forces on the locking elements. As a result, it can be attained that despite the increased locking action by the two locking elements, the user need not expend increased force when changing tool inserts.

By means of an axial contact face located on the inner jacket face of the blocking element, the radial motion of the locking elements is limited effectively and at the same time economically.

An axially displaceable restoring element allows an expanded radial motion of the locking elements. As a result, especially sturdy unlocking of the locking device is attained for the sake of inserting the tool insert.

A preferred embodiment of the restoring element has an elastic element and a holding element. The elastic element generates a restoring force while the holding element carries the restoring force onward to the blocking element and the locking elements. By means of this construction, especially economical production of the restoring element is attained.

In an especially economical way, the elastic element can be embodied as a spring.

An especially advantageous embodiment of the elastic element is obtained by the use of an elastic damping element. The latter can either by itself or in combination with a spring on the one hand furnish the requisite restoring force for locking and on the other act in damping fashion on the vibration of the locking device that is induced by the sudden operating loads.

By means of the aforementioned characteristics of the tool holder of the invention, which enhance the sturdiness of the locking of the tool insert, greater locking forces are initially attained. A restoring element of the invention with a contact shoulder and an expanded shoulder region ensures great ease of use when changing tool inserts. The contact shoulder is braced on the blocking element. By means of the restoring force of the restoring element, the blocking element is held in its axial position via the contact shoulder. The expanded shoulder region of the invention creates two unequal deflection chambers for the locking elements. The locking elements emerge radially into the deflection chambers during the insertion of the tool insert, and the unequal shape of the deflection chambers leads to a different expenditure of force on the individual locking elements. Thus in a simple, robust way, the expenditure of force during the insertion of the tool insert into the tool holder is limited.

Economical production and easy mounting of a restoring element can be attained by means of an asymmetrically annular and in particular asymmetrically conical shaping of the expanded shoulder region. The asymmetrical shape defines the unequal deflection chambers for the locking elements.

An alternative embodiment of the expanded shoulder region with two tongues permits especially economical production. The tongues are inclined at different angles W1 and W2 to the tool axis defined by the tool insert. As a result, two unequal deflection chambers for the locking elements are defined.

In both embodiments of the expanded shoulder region, the entire restoring element upon insertion of the tool insert executes a motion axially and/or in tilting fashion relative to the surrounding elements of the tool holder that receive the locking device. As a result, the locking device and the elements receiving it are mechanically loaded and subjected to wear. A restoring element according to the invention in which the expanded shoulder region has two tongues which exert different elastic forces on the various locking elements limits the number of elements exposed to a relative motion in an effective and at the same time economical way.

The vibration induced by the sudden loads on the locking device is propagated axially along the tool axis both in the direction of the end of the shaft and in the opposite direction. A frontal damping element disposed around the tool receptacle in the direction of the insertion opening has an advantageous effect on the vibration behavior and hence the wear behavior of the locking device.

A combination of a frontal damping element and of a damping element as an elastic element of the locking device has an especially advantageous effect with regard to vibration damping.

BRIEF DESCRIPTION OF THE DRAWINGS

The invention will be described in further detail below in two exemplary embodiments in conjunction with the associated drawings, in which.

DESCRIPTION OF THE PREFERRED EMBODIMENTS

Figure 1:
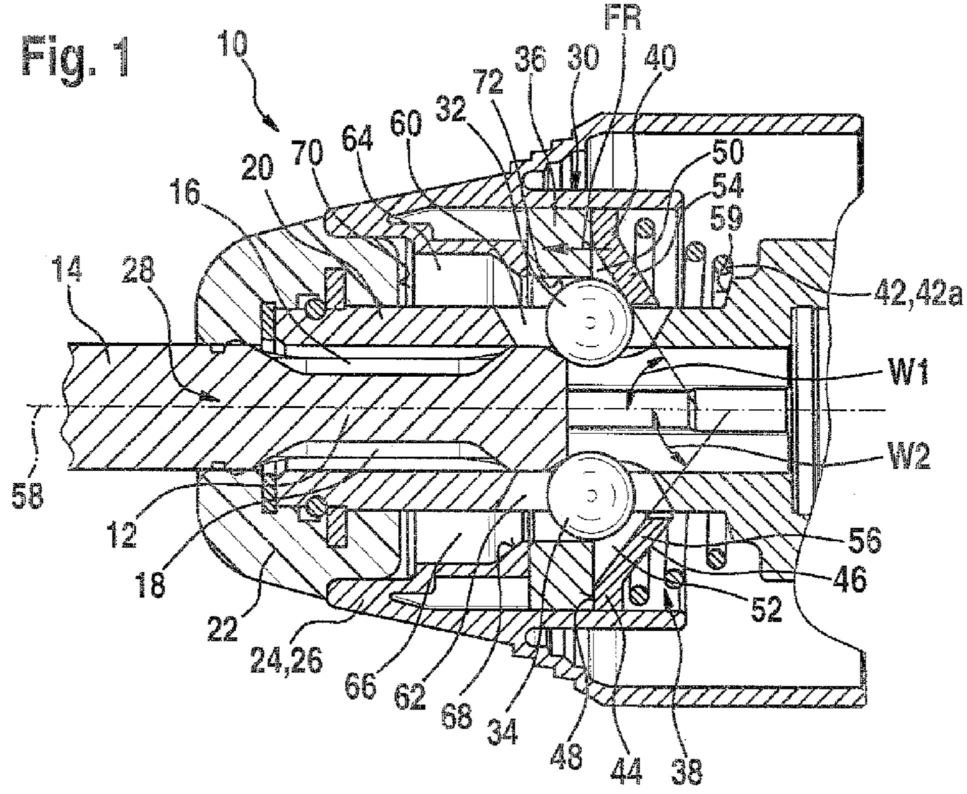
FIG. 1 is a longitudinal section through a tool holder of an electric manual chisel hammer or manual rotary hammer with a tool partly inserted.

The tool holder 10 according to the invention, shown in FIG. 1, of a chisel hammer and/or rotary hammer is intended for receiving a cylindrical shaft 12 of a tool insert 14. In this tool insert 14, the cylindrical shaft 14 has two diametrically opposed detent indentations 16, 18 in its circumferential surface.

The tool holder 10 includes a tool receptacle 20, which is tubular in its interior; a protective cap 22; and an actuation element 24. The actuation element 24 is preferably embodied as an actuation sleeve 26. The tool receptacle 20 serves to receive the cylindrical shaft 12, inserted through an insertion opening 28 on the face end of the tool holder 10. The tool holder 10 furthermore has a locking device 30 for the cylindrical shaft 12 of the tool insert 14.

In accordance with the invention, the locking device 30 includes two locking elements 32, 34, one blocking element 36, and one restoring element 38. In a preferred embodiment, the locking elements 32, 34 are embodied as locking balls, but other forms, in particular such as locking rollers or locking pegs, are also possible.

In the preferred embodiment of the tool holder 10 of the invention shown in FIG. 1, the restoring element 38 is embodied as one part, but two-, three- or multiple-part forms of the restoring element are also conceivable. It includes a holding element 40 and an elastic element 42 that generates the restoring force. The elastic element 42 is embodied as a spring element 42*a*.

The holding element 40 of the invention is distinguished by a contact shoulder 44 and an expanded shoulder region 46. The expanded shoulder region 46 together with a radial contact face 48 on the blocking element 36 forms two unequal deflection chambers 50, 52. The two receiving legs 54, 56 of the expanded shoulder region 46 are inclined at different angles of inclination W1 and W2 relative to the tool axis 58 defined by the tool insert 14.

The elastic element 42 is disposed such that, between a reference face 59 oriented toward the face-end insertion opening 28 and the holding element 40, it generates a restoring force FR that separates the holding element 40 and the reference face 59. As a result of this restoring force FR, the contact shoulder 44 of the holding element 40 is pressed against the radial contact face 48 of the blocking element 36, thereby prestressing the blocking element in its axial position with this restoring force FR.

The tool receptacle 20, at some distance from the face-end insertion opening 28, has two diametrically opposed locking recesses 60, 62. By means of these locking recesses 60, 62, a respective locking element 32, 34 can be made to engage a respective detent indentation 16, 18 of the introduced cylindrical shaft 12 of the tool insert 14. The locking recesses 60, 62 are embodied such that the locking elements 32, 34 cannot pass all the way through the tool receptacle 20.

Also in FIG. 1, two unlocking recesses 64, 66 are disposed from the face-end insertion opening 28 in the direction of the locking device 30. They are bounded by the tool receptacle 20 radially toward the tool axis 58 and by two guide faces 68 away from the tool axis 58. The guide faces 68, in the form shown here, have one conical and one cylindrical part. It is understood that other shapes are also possible, such as a hyperbolic shape of the guide faces 68. The axial boundary is attained by means of two frontal boundary faces 70 in the direction of the face-end insertion opening 28 and by the locking elements 32, 34.

The locking elements 32, 34 are radially bounded by a blocking element 36 by means of two axial contact faces 72. The blocking element 36 is disposed in the circumferential direction around the tool receptacle 20. With the aid of the actuating element 24, 26, the blocking element 36 can be displaced counter to the restoring force FR axially away from the face-end insertion opening 28 along the tool axis 58 relative to the tool receptacle 20. As a result, the two unlocking recesses 64, 66 are positioned in their axial position around the locking elements 32, 34 in such a way that the locking element can emerge radially from the locking recesses 60, 62. The emergence of the locking elements 32, 34 unlocks the tool insert 14.

Upon introduction of the cylindrical shaft 12 of the tool insert 14 through the face-end insertion opening 28 into the tool receptacle 20, the locking elements 32, 34 are initially blocked in their radial motion initially by the axial contact faces 72. As a result, the locking elements 32, 34 are pressed axially against the receiving legs 54, 56 of the expanded shoulder region 46. Because of the steeper angle of inclination W1 of the receiving leg 54, it is the first locking element 32 that first comes into contact with that leg. By further introduction of the tool insert 14, the holding element 40 is now axially displaced and tilted by the unilateral contact with the tool axis 58. As a result, the first deflection chamber 50 is uncovered for the radial emergence of the first locking element 32. The first locking element 32 thus no longer acts to block the introduction of the tool insert 14. Since the opposed receiving leg 56 is not yet in contact with the associated second locking element 34, the contact shoulder 44 is pressed on that side against the radial contact face 48 by the restoring force FR, and the blocking element 36 is held in position.

If the second locking element 34 is now, by continued insertion of the tool insert 14, thrust against the second receiving leg 56 with a shallower angle of inclination W2 of the holding element 40, thereby axially displacing the holding element, then this locking element 34 can now emerge into the second deflection chamber 52. The blocking element 36 is now held in position by the combination of the contact shoulder 44 on the side of the first locking element 32 and that locking element 32 with the axial restoring force FR of the elastic element 42.

Upon further insertion of the tool insert 14, finally, the locking elements 32, 34 can plunge into the detent indentations 16, 18 of the cylindrical shaft 12 radially to the tool axis 58. The contact shoulder 44 of the holding element 40 is thrust back into the position of repose axially in the direction of the face-end insertion opening 28 by the restoring force FR of the elastic element 42, 42*a* of the restoring element 38. The blocking element 36, now seated around the locking elements 32, 34, by means of its axial contact faces 72, prevents a radial deflection of the locking elements 32, 34 and thus prevents unlocking of the tool insert 14. The loads occurring in operation are thus distributed to two locking elements, which act to the symmetrically about the tool axis 58.

In the following drawings FIGS. 2 through 4, identical elements and characteristics are identified by the same reference numerals as in the exemplary embodiment of FIG. 1. Elements and characteristics that go beyond the description of the exemplary embodiment of FIG. 1 are assigned consecutive reference numerals. For the sake of simplicity, the reference numerals have been increased by 100 for each drawing figure.

Figure 2:
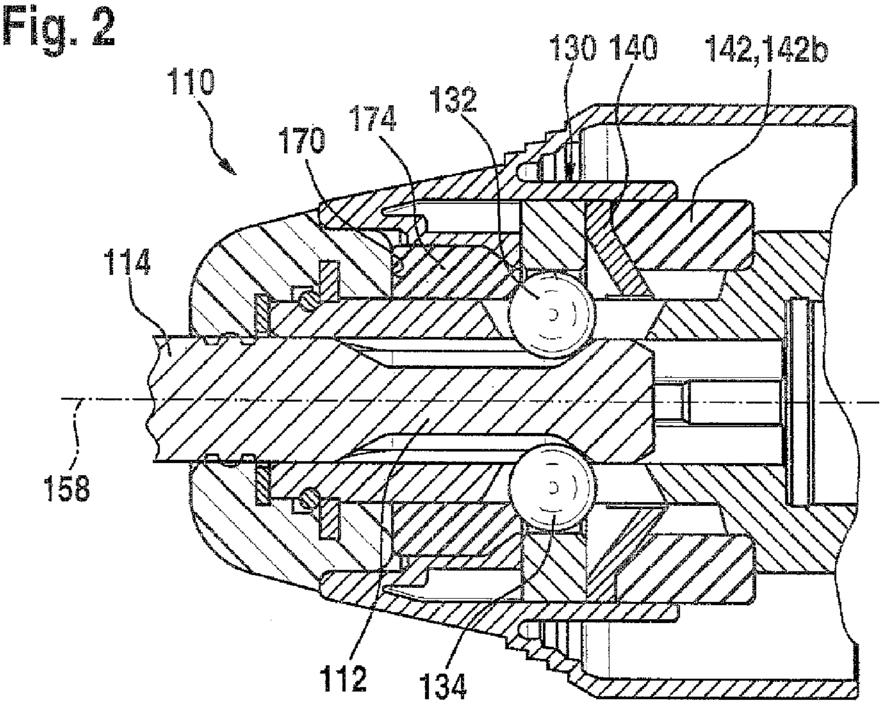
FIG. 2 is a longitudinal section through a modification of the tool holder.

FIG. 2 shows a further preferred embodiment of a tool holder 110 according to the invention as defined by the main claim. The elastic element 142 here is disposed, as a prestressed damping element 142*b*, between the reference face (not enumerate, see analogous element 59 of FIG. 1) and the holding element 140. During the change of tool inserts, the damping element 142*b* acts as the elastic element 142 that generates the restoring force FR, analogously to the exemplary embodiment of FIG. 1. The sudden accelerations of the tool insert 114 in the locking device 130 that occur during the working mode—especially at the transition from the working mode to the idling state—induce vibration of the locking device 130 that spreads along the tool axis 158, in the direction of the main part, not shown in FIG. 2, of the power tool. This vibration is damped by the damping element 142*b*. As a result, induced relative motions of individual components of the tool holder 110, and particularly of the locking device 130, are sharply reduced.

Possible expansions of the elastic element 142 realized in FIG. 2 are obtained among other ways by combining one, two or more spring elements similar to the exemplary embodiment of FIG. 1 and/or one, two or more damping elements 142*b*.

The tool holder 110 according to the invention shown in FIG. 2 is further distinguished by a frontal damping element 174. It is disposed toward the face-end insertion opening 128, between the locking elements 132, 134 and the frontal boundary faces 170. During the working mode, the frontal damping element 174 acts, in a similar way to the damping element 142*b* described in the preceding section, on those components of vibration that are propagated along the tool axis 158 in the direction of the insertion opening 128.

As is immediately apparent, the two damping elements 142*b*, 174 can be used independently of one another. The exemplary embodiments described represent merely especially simple versions of the characteristics of the invention. For instance, advantageous embodiments can be obtained among other ways by means of having the damping element or elements 142*b*, 174 in two, three or more parts. Preferably, the damping elements are made from elastomers or elastic foams. Advantageous refinements by combinations with spring elements are also conceivable.

Figure 3:
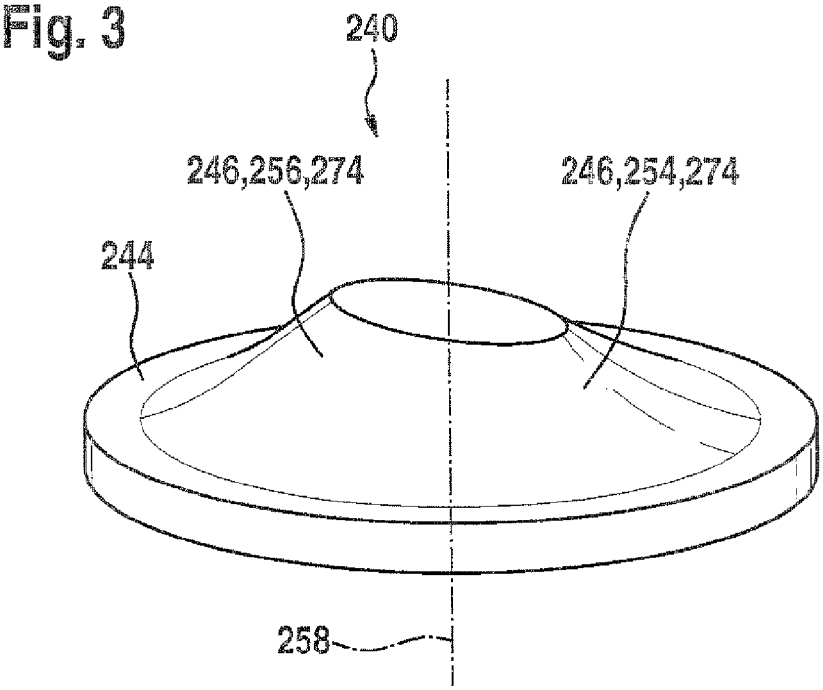
FIG. 3 shows one embodiment of the holding element.

FIG. 3 shows a first embodiment of a holding element 240 with a contact shoulder 244 and an expanded shoulder region 246. The expanded shoulder region 246 is embodied here as an asymmetrically conically shaped integrally formed support 274. By suitable installation, this integrally formed support 274 forms the two receiving legs 254, 256, which because of the asymmetrical conical shape have the angles of inclination W1 and W2 (FIG. 1) to the tool axis 258. When the cylindrical shaft 12 of the tool insert 14 is inserted, the receiving legs 254, 256 and the contact shoulder 244 act, as described in the exemplary embodiment of FIGS. 1 and 2, as geometric holding elements and guide elements on the locking elements and the blocking element, respectively.

The holding element 240 thus defined can be expanded in a way that is obvious to one skilled in the art by means of further characteristics, such as an element for mistake-free oriented assembly or by an interrupted and/or structured surface.

Figure 4:
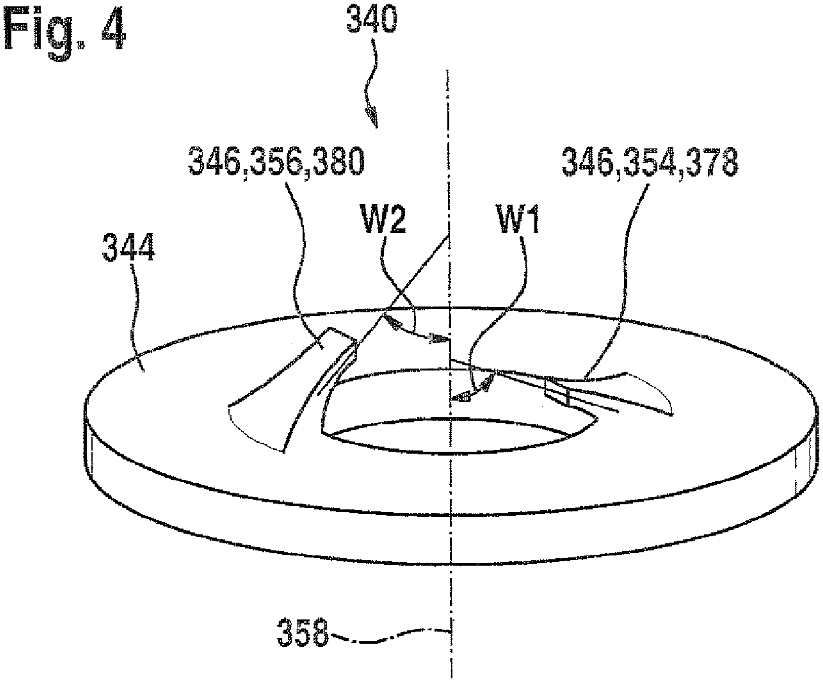
FIG. 4 shows an alternative embodiment of the holding element.

FIG. 4 shows an alternative, second embodiment of a holding element 340, in which the expanded shoulder region 346 is formed by two guide tongues 378, 380 inclined to the tool axis. With this fundamental structural form, two variants of a holding element 340 are obtained that in principle differ in their mode of operation but can be used individually or combined with one another.

In a first version, the guide tongues 378, 380 are formed by two different angles of inclination W1 and W2 to the tool axis 358. The guide tongues 378, 380 act in this way as receiving legs 354, 356 of the expanded shoulder region 346 of the holding element 340. Thus the receiving legs 354, 356 achieve an identical function of the holding element 340 to that of the exemplary embodiment of FIG. 1.

A second version of a holding element 340 as defined by the second embodiment is characterized by different elastic properties of the two guide tongues 378, 380 that are inclined to the tool axis 358. Because of the different elastic properties, the guide tongues 378, 380, in their function as receiving legs 354, 356, act with different elastic forces on the locking elements 332, 334. In this kind of version, a contact shoulder 344 that is permanently in contact with the blocking element can be attained. As a result, a relative motion and hence wear between the contact shoulder 344 of the holding element 340, the blocking element, and other elements of the tool holder are avoided.

Further versions of a holding element 340 having at least two guide tongues 378, 380 are possible, in particular by combining the characteristics of the two versions described in the foregoing sections.

The embodiments shown in FIGS. 3 and 4 for a holding element represent examples of possibilities for an embodiment. For instance, embodiments can in particular be with non-closed, for instance by means of slits and/or recesses, for the favorable refinements of a holding element of the invention. Advantageous embodiments are also conceivable by means of shapes of the outer and/or inner contours that deviate from radial symmetry around the tool axis, such as shapes with primarily quadrilateral, hexagonal or octagonal or other regular or irregular polygonal contour lines.

The foregoing relates to the preferred exemplary embodiments of the invention, it being understood that other variants and embodiments thereof are possible within the spirit and scope of the invention, the latter being defined by the appended claims.

The invention claimed is:

1. A tool holder for a power tool, in particular for a chisel hammer and/or rotary hammer, comprising:

a tool receptacle receiving a cylindrical shaft of a tool insert along a tool axis, which cylindrical shaft is introduced through an insertion opening of the tool receptacle, a circumferential surface of the cylindrical shaft provided with at least two diametrically opposed detent indentations; and a locking device that has at least two locking elements, at least one blocking element, and at least one restoring element, wherein upon insertion of the cylindrical shaft of the tool insert into the tool receptacle, the restoring element exerts different forces on the locking elements of the locking device, wherein the restoring element has a contact shoulder, for contact with the blocking element, and an expanded shoulder region, for creating two unequal deflection chambers for the locking elements, wherein the expanded shoulder region is defined by an asymmetrically shaped continuous conical surface having a continuously changing conical angle about the tool axis.

2. The tool holder as defined in claim 1, further comprising:

at least one frontal damping element disposed around the tool receptacle in the direction of the insertion opening and in contact with the tool receptacle and with the locking device, wherein contact between the at least one frontal damping element and the locking device includes only contact between the one frontal damping element and the locking elements for damping the axial motion of only the locking elements of the locking device.

3. The tool holder as defined by claim 2, wherein the blocking element limits a motion, oriented radially outward from a tool axis defined by the tool insert, of the locking elements by means of an axial contact face located on an inner jacket face of the blocking element.

4. The tool holder as defined by claim 2, wherein the restoring element is axially displaceable and upon axial displacement enables an expanded radial motion of the locking elements.

5. The tool holder as defined by claim 3, wherein the restoring element is axially displaceable and upon axial displacement enables an expanded radial motion of the locking elements.

6. The tool holder as defined by claim 2, wherein the restoring element is constructed of an elastic element, generating the restoring force, and a holding element.

7. The tool holder as defined by claim 3, wherein the restoring element is constructed of an elastic element, generating the restoring force, and a holding element.

8. The tool holder as defined by claim 5, wherein the restoring element is constructed of an elastic element, generating the restoring force, and a holding element.

9. The tool holder as defined by claim 6, wherein the elastic element is a spring element and/or an elastic damping element and acts between the holding element and a reference face of the tool receptacle.

10. The tool holder as defined by claim 7, wherein the elastic element is a spring element and/or an elastic damping element and acts between the holding element and a reference face of the tool receptacle.

11. The tool holder as defined by claim 8, wherein the elastic element is a spring element and/or an elastic damping element and acts between the holding element and a reference face of the tool receptacle.

12. A tool holder for a power tool, in particular for a chisel hammer and/or rotary hammer, comprising:

a tool receptacle receiving a cylindrical shaft of a tool insert along a tool axis, which cylindrical shaft is introduced through an insertion opening of the tool receptacle, a circumferential surface of the cylindrical shaft provided with at least two diametrically opposed detent indentations;

a locking device that has at least two locking elements, at least one blocking element, and at least one restoring element, wherein upon insertion of the cylindrical shaft of the tool insert into the tool receptacle, the restoring element exerts different forces on the locking elements of the locking device, wherein the restoring element has a contact shoulder, for contact with the blocking element, and an expanded shoulder region, for creating two unequal deflection chambers for the locking elements, and wherein the expanded shoulder region is formed by at least two guide tongues separate from each other, which extend from the contact shoulder at different angles to the tool axis, in the direction of the tool axis.

13. The tool holder as defined by claim 12, wherein the expanded shoulder region is shaped asymmetrically annularly and in particular asymmetrically conically with a continuously changing conical angle about the tool axis.

14. The tool holder as defined by claim 1, wherein the expanded shoulder region is formed by at least two guide tongues, which extend from the contact shoulder at different angles to a tool axis defined by the tool insert, in the direction of the tool axis.

15. The tool holder as defined in claim 12, further comprising at least one frontal damping element disposed around the tool receptacle in the direction of the insertion opening and in contact with the tool receptacle and with the locking device, wherein contact between the at least one frontal damping element and the locking device includes only contact between the one frontal damping element and the locking elements for damping the axial motion of only the locking elements of the locking device.

* * * * *